(12) United States Patent
Seki et al.

(10) Patent No.: US 9,732,402 B2
(45) Date of Patent: Aug. 15, 2017

(54) ALUMINUM ALLOY FOIL AND METHOD FOR MANUFACTURING SAME

(71) Applicant: UACJ Corporation, Chiyoda-ku, Tokyo (JP)

(72) Inventors: Masakazu Seki, Chiyoda-ku (JP); Satoshi Suzuki, Chiyoda-ku (JP)

(73) Assignee: UACJ CORPORATION, Tokyo (JP)

(*) Notice: Subject to any disclaimer, the term of this patent is extended or adjusted under 35 U.S.C. 154(b) by 90 days.

(21) Appl. No.: 14/417,039

(22) PCT Filed: Jul. 24, 2013

(86) PCT No.: PCT/JP2013/070072
§ 371 (c)(1),
(2) Date: Jan. 23, 2015

(87) PCT Pub. No.: WO2014/021170
PCT Pub. Date: Feb. 6, 2014

(65) Prior Publication Data
US 2015/0203941 A1 Jul. 23, 2015

(30) Foreign Application Priority Data

Aug. 1, 2012 (JP) ................. 2012-171523

(51) Int. Cl.
*H01M 2/02* (2006.01)
*C22C 21/00* (2006.01)
(Continued)

(52) U.S. Cl.
CPC .............. *C22C 21/00* (2013.01); *B32B 15/01* (2013.01); *B32B 15/016* (2013.01); *B65D 23/02* (2013.01);
(Continued)

(58) Field of Classification Search
CPC ...... H01M 2/02; H01M 2/026; H01M 2/0262; B65D 23/02; B65D 23/08; B65D 23/0807; C22C 21/00; C22F 1/04
See application file for complete search history.

(56) References Cited

U.S. PATENT DOCUMENTS 3,691,972 A 9/1972 Bylund
3,814,590 A 6/1974 Bylund

FOREIGN PATENT DOCUMENTS

GB 1083294 A 9/1967
JP 51-18362 A 2/1976
(Continued)

OTHER PUBLICATIONS

Extended European Search Report mailed Mar. 10, 2016, issued in corresponding International Application No. PCT/JP2013/070072, filed Jul. 24, 2013, 9 pages.
(Continued)

*Primary Examiner* — Karie O'Neill Apicella
(74) *Attorney, Agent, or Firm* — Christensen O'Connor Johnson Kindness PLLC

(57) ABSTRACT

An aluminum alloy foil having superior formability is provided. An aluminum alloy foil, including 0.8 to 2.0 mass % of Fe, 0.05 to 0.2 mass % of Si, and 0.0025 to 0.5 mass % of Cu, with the rest consisting of Al and unavoidable impurities, wherein the aluminum alloy foil has an average crystal grain size of 20 μm or less, and a number of intermetallic compounds existing in the aluminum alloy foil, the intermetallic compounds having a circle equivalent diameter of 1.0 to 5.0 μm, is $1.0 \times 10^4$ grains/mm$^2$ or more, is provided.

7 Claims, 1 Drawing Sheet

(51) Int. Cl.
  *C22F 1/04* (2006.01)
  *B65D 23/08* (2006.01)
  *B65D 23/02* (2006.01)
  *B32B 15/01* (2006.01)

(52) U.S. Cl.
  CPC ............ *B65D 23/0807* (2013.01); *C22F 1/04* (2013.01); *H01M 2/026* (2013.01); *H01M 2/0275* (2013.01); *H01M 2/0285* (2013.01); *H01M 2/0287* (2013.01); *H01M 2/0272* (2013.01); *H01M 2/0292* (2013.01); *H01M 2002/0297* (2013.01); *Y10T 428/1359* (2015.01)

(56) References Cited

FOREIGN PATENT DOCUMENTS

| | | |
|---|---|---|
| JP | 01-279725 A | 11/1989 |
| JP | 2000-226627 A | 8/2000 |
| JP | 2002-038234 A1 | 2/2002 |
| JP | 2004-027353 A | 1/2004 |
| JP | 2005-163077 A | 6/2005 |
| JP | 2005-163097 A | 6/2005 |
| JP | 2006-312768 A | 11/2006 |
| JP | 2006312768 A * | 11/2006 ............ C22C 21/00 |
| JP | 2007-308805 A1 | 11/2007 |
| JP | 2009-221567 A1 | 10/2009 |
| JP | 2012-021205 A | 2/2012 |
| JP | 2012-052158 A | 3/2012 |
| WO | 2012/036181 A1 | 3/2012 |
| WO | WO2012036181 A * | 8/2012 ............ C22C 21/00 |

OTHER PUBLICATIONS

International Search Report mailed Oct. 8, 2013, in International Application No. PCT/JP2013/070072, filed Jul. 24, 2013, 4 pages.
Official Notification mailed Jan. 18, 2016, issued in corresponding Chinese Application No. 201380039469.X, filed Jul. 24, 2013, 12 pages.
Japanese Office Action dated Jun. 6, 2017, in corresponding Japanese Application No. 2014-528095, filed Aug. 1, 2012, 6 pages.

* cited by examiner

ALUMINUM ALLOY FOIL AND METHOD FOR MANUFACTURING SAME

TECHNICAL FIELD

The present invention relates to an aluminum alloy foil having high formability, and to a manufacturing method thereof.

BACKGROUND

In many cases, PTP (press through package) for packaging medicine is structured by combining a container and a cover. The container need be formed by deep drawing, and the container of an ordinary strip package body utilizes a plastic film such as a resin film of polypropylene and the like. In particular, regarding a tablet and the like which require a vapor barrier property during storage, a composite body having an aluminum alloy foil with high barrier property and a resin film bonded on one side or both sides thereof is often used. In recent years, medicines take various shapes and sizes, and thus the package for packaging these medicines need be formed with a deeper shape for complying with such shape.

In addition, in order to provide vapor barrier property to an external material of a secondary battery, a material structured as a composite body having resin films bonded onto both sides of an aluminum alloy foil is used. In recent years, reduction in size and weight have been seen in electronic devices such as a mobile communication device, a laptop computer, a stereo headphone, a camcorder and the like. Accordingly, secondary batteries such as a lithium ion secondary battery and the like having a thin sheet form are appreciated as a driving source of such devices. Charging capacity or high output capable of enduring the long-term usage is required for the secondary battery. Therefore, the structure of the battery element structured with and electrode and a separator has become complicated and multilayered. This resulted in the requirement to bulge of deeper concave portions and the like under severe conditions.

In particular, regarding the external material of the lithium ion secondary battery having a thin sheet form, square-cup drawing is conducted. In the square-cup drawing, the radius R of the shoulder portion and the corner portion are made smaller at the four corners of the bulged concave portions. Accordingly, the bulging height can be made deeper, thereby resulting in increase in the amount of the electrode material filled in the bulged concave portions and achieving higher battery capacity. In addition, when a square-cup drawing test is conducted, high blank holding force is often applied in order to suppress the occurrence of flange wrinkles. When a high blank holding force is applied, a high friction force is generated in between the both surfaces of the die and the external material, resulting in heavy punching load. Accordingly, in order to conduct a deeper bulging in the square-cup drawing, it is important to improve the strength of the external material of the lithium ion secondary battery. That is, high strength is required for the aluminum alloy foil structuring the external material of the lithium ion secondary battery.

As shown in FIG. 2, the package body 1 for forming is generally structured by laminating a heat sealing layer 9 on one side of the external material main body 8, and a synthetic resin film 10 on the other side thereof. As shown in FIG. 1, the package body 1 is bulged so as to have a concave portion in the center portion and a planar portion in the peripheral portion. The concave portion is provided to contain the laminated body such as the positive electrode current collector 2 and the like. Therefore, it is necessary to use the external material main body 8, the heat sealing layer 9, and the synthetic resin film 10 having superior formability.

Conventionally, as the external material main body 8, metal foils with low moisture and air permeability and superior formability, especially an aluminum alloy foil has been preferably used, in order to avoid adverse effect on the quality of the content. As such aluminum alloy foil, the ones with the composition specified by JIS 1100, 3003, 8079 or 8021 has been mainly used.

For example, regarding the external material main body 8, an aluminum foil having a thickness of 20 to 60 µm, and being elongated by 11% or more, the elongation being in the direction of 0 degrees, 45 degrees, and 90 degrees with respect to the rolling direction, has been suggested (Patent Literature 1). In addition, also regarding the external material main body 8, an aluminum alloy foil having a superior corrosion resistance, containing 0.8 to 2.0% of Fe, 0.02 to 0.05% of Cu, and 0.03 to 0.1% of Si has been suggested (Patent Literature 2). In addition, also regarding the external material main body 8, a high-strength aluminum alloy foil containing 0.8 to 2.0% of Fe, 0.2% or less of Si, and 0.1% or less of Mn, with specified intermetallic compound having a circle equivalent diameter of 0.2 to 1.0 µm (Patent Literature 3).

CITATION LIST

Patent Literature

[Patent Literature 1] JP 2005-163077A
[Patent Literature 2] JP 2006-312768A
[Patent Literature 3] JP 2005-163097A

SUMMARY OF INVENTION

Technical Problem

However, when the square-cup drawing test is conducted under the conditions of high blank holding force, as in the case of the external material used in the recent lithium ion secondary batteries and the like, the conventional techniques as described in the afore-mentioned literatures had difficulty in achieving sufficient characteristics required for the high bulging height.

When the square-cup drawing was conducted with the aluminum alloy foil of Patent Literature 1, such severe conditions for bulging a deep concave portion sometimes resulted in occurrence of cracks and pin-holes in the periphery of the shoulder portions of the concave portions. That is, such problem was not observed when a comparatively shallow concave portion was bulged with the aluminum alloy foil. However, when a deep concave portion was bulged in the center portion of the package with the aluminum alloy foil in order to increase the volume of the content, cracks and the like was prone to occur especially in the boundary portion of the concave portion and the planar portion of the external material main body. This would allow easy permeation of moisture and air, thereby resulting in defective package which would have adverse effect on the quality of its content. Especially, when it is used for the external material of a secondary battery, the permeation of moisture and air would generate hydrofluoric acid by the reaction of the moisture and air with the electrolyte in the battery, and thus the internal of the battery would be easily corroded. In addition, although the elongation value in the 0 degrees, 45 degrees, and 90 degrees with respect to the rolling direction has been improved in the aluminum alloy foil of Patent Literature 1 in order to improve the formability, each of the strength of these rolling directions is not sufficient, and it is difficult to miniaturize the crystal grain size. Therefore, higher formability cannot be achieved.

In addition, although the alloy component and the number of intermetallic compounds are restricted in the aluminum alloy foil of Patent Literature 2 in order to improve the corrosion resistance and strength, sufficient improvement in strength cannot be achieved by controlling these physical properties only. Therefore, higher formability cannot be achieved.

Further, although an aluminum alloy foil having high strength and controlled number of intermetallic compounds is suggested in Patent Literature 3, sufficient miniaturization of crystal grain size and improvement in strength cannot be achieved by controlling the intermetallic compounds only. Therefore, higher formability cannot be achieved.

The present invention has been made by taking the afore-mentioned circumstances into consideration. An object of the present invention is to provide an aluminum alloy foil having a superior formability and a manufacturing method thereof.

Solution to Problem

The present inventors have made a study on the aluminum alloy foil used as the formed packaging material, and have found that formability can be largely improved by restricting the composition in an appropriate range and by optimizing the number of the intermetallic compounds and the crystal grain size, thereby leading to completion of the present invention.

That is, according to the present invention, provided is an aluminum alloy foil, comprising: 0.8 to 2.0 mass % of Fe, 0.05 to 0.2 mass % of Si, and 0.0025 to 0.5 mass % of Cu, with the rest consisting of Al and unavoidable impurities, wherein the aluminum alloy foil has an average crystal grain size of 20 μm or less, and a number of intermetallic compounds existing in the aluminum alloy foil, the intermetallic compounds having a circle equivalent diameter of 1.0 to 5.0 μm, is $1.0 \times 10^4$ grains/mm$^2$ or more.

In particular, an average value of tensile strength of the aluminum alloy foil in 0 degrees, 45 degrees, and 90 degrees with respect to the rolling direction is preferably 100 N/mm$^2$ or higher. By such restriction, the aluminum alloy foil of the present invention can achieve improvement in the height of bulging even when the square-cup drawing is conducted under high blank holding force with heavy drawing load.

In addition, according to the present invention, a formed packaging material preferably comprises the afore-mentioned aluminum alloy foil. According to this formed packaging material, the bulging height can be made high since the aluminum alloy foil having superior formability is used. Therefore, a deeper concave portion can be bulged in the formed packaging material of the external material for secondary batteries and the like. As a result, the volume of the electrode material being filled in the bulged concave portion can be increased, thereby improving capacity.

Further, it is preferable that the present invention provides a secondary battery using the afore-mentioned formed packaging material. According to such secondary battery, the usage of the formed packaging material having the deep concave portion enables to increase the amount of battery material such as the electrode material and the like being filled in the bulged concave portion of the secondary battery external material. Therefore, secondary battery with high performance such as high battery capacity can be achieved.

In addition, it is preferable that the present invention provides a package container for medicine using the afore-mentioned formed packaging material. According to such package container for medicine, the formed packaging material having a deep concave portion is used. Therefore, the degree of freedom to select the amount and shape of the medicine to be contained in the concave portion can be further improved.

In addition, according to the present invention, provided is a method for manufacturing the afore-mentioned aluminum alloy foil, comprising the steps of: performing a homogeneous retention of an aluminum alloy ingot comprising 0.8 to 2.0 mass % of Fe, 0.05 to 0.2 mass % of Si, and 0.0025 to 0.5 mass % of Cu, with the rest consisting of Al and unavoidable impurities at 400° C. or higher and 550° C. or lower for 1 hour or longer and 6 hours or shorter; performing a hot rolling and a cold rolling after the homogeneous retention; performing an intermediate annealing by retaining at 350° C. or higher in between the cold rolling; performing the cold rolling at a cold rolling rate of 95% or higher from after the intermediate annealing until achieving final foil thickness; and performing final annealing after the cold rolling to obtain the aluminum alloy foil.

According to this method, an aluminum alloy ingot having a specific composition is treated under a specific process, and then the cold rolling rate from after the intermediate annealing until achieving final foil thickness is controlled appropriately. Therefore, the average crystal grain size and the number of intermetallic compounds existing in the aluminum alloy foil can be controlled appropriately. Accordingly, an aluminum alloy foil suitable for formed packaging material used for lithium ion secondary batteries and the like which require high formability can be provided.

Advantageous Effects of Invention

According to the present invention, composition of the aluminum alloy foil, average crystal grain size, and the number of the specific intermetallic compounds in the aluminum alloy foil are controlled appropriately. Therefore, an aluminum alloy foil suitable for formed packaging material used for the lithium ion secondary battery, package container for medicines and the like which require high formability can be provided.

Figure 1:
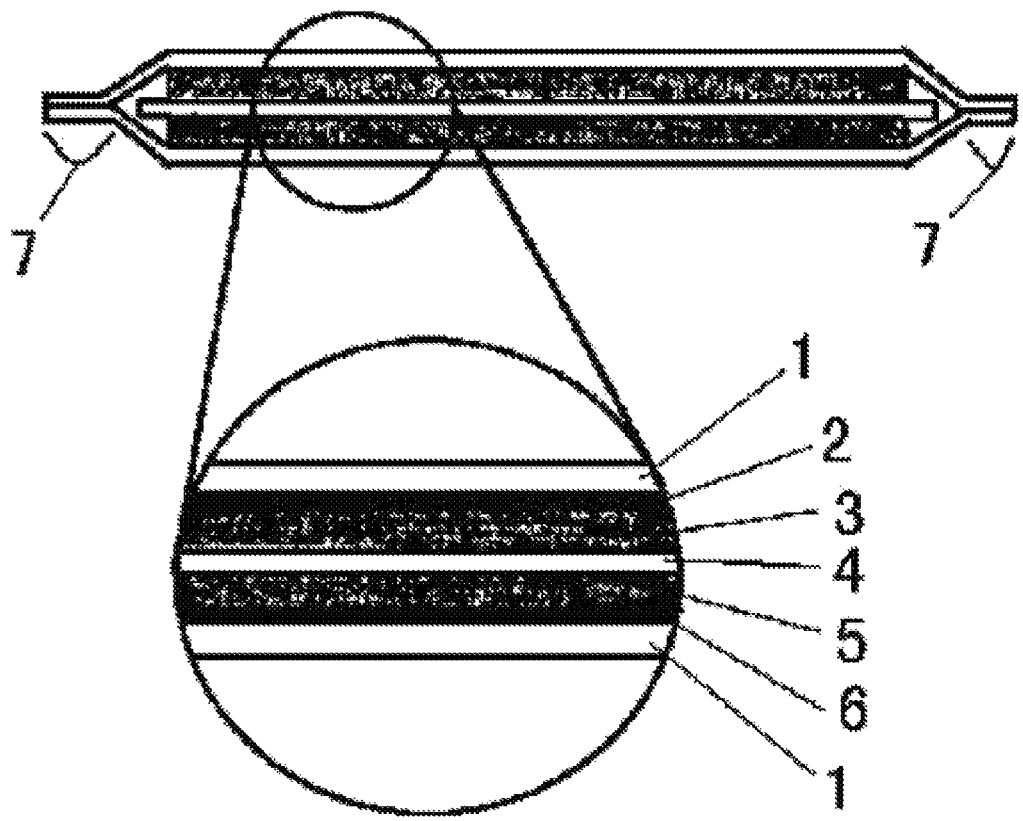
FIG. 1 is a schematic cross-sectional view showing one example of the internal structure of the lithium ion secondary battery having a thin sheet form.

DESCRIPTION OF EMBODIMENTS (1) Composition of Aluminum Alloy Foil

In the present embodiment, the content of Fe in the aluminum alloy foil is 0.8 to 2.0 mass %. By adding Fe in this range, strength and elongation property can be improved. In addition, the intermetallic compounds having a circle equivalent diameter of 1.0 to 5.0 μm, which can serve as a nucleus generation site for recrystallization increases, resulting in fine crystal grain size after the recrystallization. Accordingly, uniform deformation can be easily achieved when the square-cup drawing is conducted, resulting in improved formability. When the content of Fe is less than 0.8 mass %, strength decreases and the crystal grain size becomes coarse. Therefore, formability decreases. On the other hand, when the content of Fe exceeds 2.0 mass %, huge intermetallic compounds are easily generated during casting, thereby resulting in frequent occurrence of cracks during cold rolling. In addition, since the intermetallic compounds can serve as the starting point of cracks during the square-cup drawing test, formability decreases. From the viewpoint of strength and manufacturing advantages, the content of Fe is preferably 1.1 mass % or more and 1.7 mass % or less. Fe content is, for example, 0.8, 0.9, 1.0, 1.1, 1.2, 1.3, 1.4, 1.5, 1.6, 1.7, 1.8, 1.9, or 2.0 mass %. Fe content may be in the range of two values selected from the values exemplified above.

The Si content of the aluminum alloy foil according to the present embodiment is 0.05 to 0.2 mass %. By adding Si in this range, strength can be improved.

When the content of Si is less than 0.05 mass %, the strength decreases, and thus formability decreases. In addition, base metal with high purity (Al) need be used, which is unfavorable in terms of economic aspects. On the other hand, when the content of Si exceeds 0.2 mass %, the intermetallic compounds having a circle equivalent diameter of 1.0 to 5.0 μm, which can serve as a nucleus generation site for recrystallization decreases, resulting in larger crystal grain size after the final annealing. Accordingly, uneven forming easily occurs, resulting in decrease in the formability. From the viewpoint of strength and crystal grain size, the content of Si is preferably 0.06 mass % or more and 0.1 mass % or less. Si content is, for example, 0.05, 0.06, 0.07, 0.08, 0.09, 0.10, 0.11, 0.12, 0.13, 0.14, 0.15, 0.16, 0.17, 0.18, 0.19, or 0.20 mass %. Si content may be in the range of two values selected from the values exemplified above.

The Cu content of the aluminum alloy foil according to the present embodiment is 0.0025 to 0.5 mass %. By adding Cu in this range, strength can be improved. When the content of Cu is in the afore-mentioned range, major portion of the Cu added forms a solid solution in the aluminum alloy as the parent phase. Therefore, there is hardly any change in the number of the intermetallic compounds having a circle equivalent diameter of 1.0 to 5.0 μm, which can serve as a nucleus generation site for recrystallization. Accordingly, when the addition amount is in the afore-mentioned range, the crystal grain size can be kept fine, while obtaining high strength by the effect of Cu forming solid solution in the aluminum alloy.

When the content of Cu is less than 0.0025 mass %, the strength decreases, and thus formability decreases. On the other hand, when the content of Cu exceeds 0.5 mass %, the work hardening during rolling becomes large, thereby resulting in decrease in the rollability during cold rolling. From the viewpoint of strength and rollability, the content of Cu is preferably 0.005 mass % or more and 0.4 mass % or less. Cu content is, for example, 0.0025, 0.005, 0.01, 0.05, 0.1, 0.11, 0.15, 0.2, 0.21, 0.25, 0.3, 0.31, 0.35, 0.4, 0.45, or 0.5 mass %. Cu content may be in the range of two values selected from the values exemplified above.

The content of each of the unavoidable impurities in the aluminum alloy foil of the present embodiment is 0.05 mass % or less, and the total amount of the unavoidable impurities is 0.15 mass % or less. In particular, with respect to the unavoidable impurities of Ti, Mn, Mg, Zn and the like, when the content of each of these unavoidable impurities exceeds 0.05 mass % and the total amount of these unavoidable impurities exceed 0.15 mass %, the hardening during the rolling becomes large, and thus cuts easily occur during the rolling.

(2) Physical Property of Aluminum Alloy Foil

The average crystal grain size with respect to the aluminum alloy foil of the present embodiment is 20 μm or less. Preferably, the average crystal grain size is 16 μm or less. The average crystal grain size is, for example, 5, 6, 7, 8, 9, 10, 11, 12, 13, 14, 15, 16, 17, 18, 19, or 20 μm or less. The average crystal grain size may be in the range of two values selected from the values exemplified above. The average crystal grain size can be measured by known methods, such as the intercept method for example. The intercept method is a method in which the number of crystal grains found in a line segment is counted, and then the length of the line segment is divided by the number of crystal grains.

The average crystal grain size of the aluminum alloy foil is influenced largely by the amount of element being added, and by the various manufacturing conditions. In particular, the component of the aluminum alloy foil, the number of intermetallic compounds in the aluminum alloy foil, the cold rolling rate from after the intermediate annealing until achieving final foil thickness, and the final annealing conditions have a large influence. Regarding the aluminum alloy component of the present embodiment having Cu added in addition to Fe and Si, recrystallization becomes difficult during the final annealing due to the influence of Cu forming a solid solution in the aluminum alloy. In order to allow recrystallization with fine crystal grain size during the final annealing, intermetallic compounds having a circle equivalent diameter of 1.0 to 5.0 μm, which can serve as a nucleus generation site for recrystallization shall be present in the aluminum alloy by $1.0 \times 10^4$ grains/mm².

When the average crystal grain size of the aluminum alloy foil exceeds 20 μm, the number of crystal grains occupying in cross sectional plane in the direction of the sheet thickness becomes less. Accordingly, localized deformation occurs easily, and the formability decreases. In addition, when the average crystal grain size of the aluminum alloy foil is large, the adhesion property with the resin film which structures the external material decreases. Therefore, when the square-cup drawing test is conducted, peeling off occur at the interface between the resin film and the aluminum alloy foil, and thus causes decrease in formability.

The number of the intermetallic compounds having a circle equivalent diameter of 1.0 to 5.0 μm is $1.0 \times 10^4$ grains/mm² or more with respect to the aluminum alloy foil of the present embodiment. Preferably, the number of such intermetallic compounds is $1.5 \times 10^4$ grains/mm² or more. The number of such intermetallic compounds is, for example, $1.0 \times 10^4$, $1.5 \times 10^4$, $2.0 \times 10^4$, $2.5 \times 10^4$, or $3.0 \times 10^4$ grains/mm² or more. The number of such intermetallic compounds may be in the range of two values selected from the values exemplified above. These intermetallic compounds are structured by Al—Fe based or Al—Fe—Si based compounds. Since these intermetallic compounds serves as the nucleus generation site during recrystallization, the more the number of these intermetallic compounds, the finer the crystal grain diameter after the final annealing becomes. Accordingly, the strength of the aluminum alloy film can be improved, allowing easier uniform deformation when the square-cup drawing test is conducted. Therefore, formability is improved.

When the circle equivalent diameter of the intermetallic compounds is less than 1.0 μm or less, or the number of the intermetallic compounds is less than $1.0 \times 10^4$ grains/mm², the effect of the intermetallic compounds serving as the nucleus generation site during recrystallization is small. Accordingly, effect on the crystal grain refinement is small. Therefore, high strength cannot be achieved, and thus localized deformation occurs easily when the square-cup drawing test is conducted. The intermetallic compounds having a circle equivalent diameter exceeding 5.0 μm would be a triggering point of pin-holes and would be a cause for cracks during cold rolling, and thus they are likely to cause decrease in productivity. In addition, when the square-cup drawing test is conducted, such intermetallic compounds are prone to serving as a triggering point of cracks and the like, thereby decreasing formability.

The number of intermetallic compounds can be measured by known methods. For example, the surface of the aluminum alloy foil can be observed with an optical microscope. In addition, data acquisition can be conducted with a computer for the microscopic image of the aluminum alloy foil, and the data can be analyzed using image analysis software.

In the present embodiment, the surface of the aluminum alloy foil is subjected to mirror polishing, and then observation is made for 10 visual fields by the magnification of 400. The number of the intermetallic compounds is measured using an image analysis device. Then, the circle equivalent diameters for each of the intermetallic compounds are obtained. There is no particular limitation with respect to the method for measuring the number of the intermetallic compounds and measuring the circle equivalent diameter. Here, image analysis software can be used, such as "EIZO-kun" (available from Asahi Kasei Engineering Corporation).

Here, in the present specification, the circle equivalent diameter is defined as a converted diameter of a perfect circle having the area of the intermetallic compound.

Regarding the strength of the aluminum alloy foil of the present embodiment, it is preferable that the average of the tensile strength in the 0 degrees, 45 degrees, and 90 degrees with respect to the rolling direction is 100 N/mm$^2$ or higher. In addition, it is more preferable that the average is 110 N/mm$^2$ or higher. The average of the tensile strength in the 0 degrees, 45 degrees, and 90 degrees with respect to the rolling direction is, for example, 100, 110, 120, 130, 140, 150, or 200 N/mm$^2$ or higher. The average may be in the range of two values selected from the values exemplified above.

When the square-cup drawing which applies high blank holding force is conducted, the friction force between the die and the external material becomes large, and thus the drawing load applied with the punching device becomes large. Therefore, in order to achieve higher bulging height when the square-cup drawing test is conducted, it is necessary that the strength of the side wall of the external material is larger than the drawing load from the punching device, the load from the punching device being the sum of the friction force generated in between the die and the external material and the inflow resistance of the material generated when the flange deforms. That is, improvement in the strength of the side wall of the external material would achieve the improvement in the bulging height when the square-cup drawing test is conducted. Therefore, the higher the tensile strength of the aluminum alloy foil structuring the external material, the more preferable. In addition, when the square-cup drawing test is conducted, the strength at each of the short side portion, the long side portion, and the flange portion need be improved. Therefore, each of the strength in the 0 degrees, 45 degrees, and 90 degrees with respect to the rolling direction need be made high. When the average of the tensile strength in the 0 degrees, 45 degrees, and 90 degrees with respect to the rolling direction is less than 100 N/mm$^2$, it becomes difficult to obtain high bulging height when the square-cup drawing is conducted.

There is no particular limitation regarding the yield strength of the aluminum alloy foil according to the present embodiment. It is preferable that the average value of 0.2% yield strength in the 0 degrees, 45 degrees, and 90 degrees with respect to the rolling direction is 65 N/mm$^2$ or higher. When the average of the yield value is lower than 65 N/mm$^2$, the sheet thickness of the flange portion is easily decreased due to the plastic deformation caused by application of high blank holding force. As a result, ruptures easily occur at the side wall portion when the square-cup drawing is conducted, which would lead in a case where obtainment of high bulging height becomes difficult.

There is no particular limitation regarding the elongation property of the aluminum alloy foil according to the present embodiment. By varying the average crystal grain size, strength, and the like, the elongation property can be adjusted arbitrary, and there are cases where the higher elongation value would result in desirable formability. Specifically, it is preferable that the average of the elongation value in the 0 degrees, 45 degrees, and 90 degrees with respect to the rolling direction is 15% or higher, since the formability would be desirable. In particular, it is more preferable that the average of the elongation value in the 0 degrees, 45 degrees, and 90 degrees with respect to the rolling direction is 17% or higher.

There is no particular limitation regarding the thickness of the aluminum alloy foil according to the present embodiment. The thickness can be adjusted so as to meet the intended use, forming conditions, and the like. Here, in general, the thickness is preferably 10 to 100 μm. When an aluminum alloy foil having a thickness of less than 10 μm is manufactured, generation of pinholes and cuts during rolling occur easily, and thus the productivity tends to decrease. In addition, when the thickness exceeds 100 μm, the thickness of the entire package would become too thick. This is undesirable since it becomes difficult to reduce the size of the formed package.

(3) Manufacturing Method of Aluminum Alloy Foil

In the present embodiment, the aluminum alloy foil is manufactured by a method comprising the steps of: performing a homogeneous retention of an aluminum alloy ingot comprising 0.8 to 2.0 mass % of Fe, 0.05 to 0.2 mass % of Si, and 0.0025 to 0.5 mass % of Cu, with the rest consisting of Al and unavoidable impurities at 400° C. or higher and 550° C. or lower for 1 hour or longer and 6 hours or shorter; performing a hot rolling and a cold rolling after the homogeneous retention; performing an intermediate annealing by retaining at 350° C. or higher in between the cold rolling; performing the cold rolling at a cold rolling rate of 95% or higher from after the intermediate annealing until achieving final foil thickness; and performing final annealing after the cold rolling to obtain the aluminum alloy foil. Hereinafter, the manufacturing method of the aluminum alloy foil according to the present embodiment will be described in detail.

The manufacturing method of the aluminum alloy foil according to the present embodiment is as follows. After melting the aluminum alloy having the composition as mentioned above, semi-continuous casting is carried out to obtain an ingot. Subsequently, homogeneous retention is carried out at 400° C. or higher and 550° C. or lower for 1 hour or more and 6 hours or less. After the homogeneous retention, hot rolling is started. The purpose of the homogeneous retention is to allow existence of many intermetallic compounds having a circle equivalent diameter of 1.0 to 5.0 µm which tends to serve as the nucleus generation site during recrystallization carried out during the casting. This would result in refinement of the crystal grain size. When the retention temperature is lower than 400° C. and the retention period is less than 1 hour, the segregation formed in the ingot during the casting cannot be made uniform sufficiently. As a result, cracks easily occur during the cold rolling, and thus productivity decreases. When the homogeneous retention is carried out with the retention temperature exceeding 550° C. and a retention period exceeding 6 hours, the intermetallic compounds precipitated during casting would aggregate. This would result in decrease in the number of intermetallic compounds having a circle equivalent diameter of 1.0 to 5.0 µm which tends to serve as the nucleus generation site during recrystallization. Accordingly, the crystal grain size would become coarse, resulting in decrease in strength. From the viewpoint of distributing the intermetallic compounds with desirable size, the homogeneous retention temperature is preferably 430° C. or higher and 530° C. or lower. The homogeneous retention temperature is, for example, 400, 430, 450, 470, 510, 520, 530, 540, or 550° C. The homogeneous retention temperature may be in the range of two values selected from the values exemplified above.

After the completion of the afore-mentioned homogeneous retention, hot rolling is conducted. There is no particular limitation regarding the starting temperature of the hot rolling. From the viewpoint of productivity, it is preferable to perform hot rolling immediately after the completion of the homogeneous retention. For example, the starting temperature of the hot rolling is preferably 400° C. or higher. The starting temperature is more preferably 430° C. or higher, and most preferably 450° C. or higher. It is preferable to allow recrystallization in the aluminum alloy sheet as much as possible during the hot rolling, and the end-point temperature of the hot rolling is preferably 250 to 400° C. From the viewpoint of the necessity to allow recrystallization in the aluminum alloy sheet after hot rolling more securely, the end-point temperature is more preferably 300 to 400° C. In addition, cold rolling is carried out after the hot rolling. The cold rolling can be performed by known methods, and there is no particular limitation.

The manufacturing method of the aluminum alloy foil according to the present embodiment require an intermediate annealing at 350° C. or higher in between the cold rolling processes. The intermediate annealing is performed preferably at 370° C. or higher, and more preferably at 400° C. or higher. By performing the intermediate annealing, recrystallization can be allowed to proceed in the aluminum alloy sheet, thereby achieving improvement in rollability. In particular, since the aluminum alloy of the present embodiment is added with Cu in addition to Fe and Si, the deformation resistance during the cold rolling becomes large. Therefore, it is necessary to perform a single intermediate annealing in between the cold rolling processes carried out from after the hot rolling until achieving final foil thickness, in order to prevent sheet cuts during the cold rolling.

The period for performing the intermediate annealing is not particularly limited. In order to allow the recrystallization to proceed, the period is preferably 1 hour or more, more preferably 2 hours or more. When the intermediate annealing is not performed, the cold rolling rate until achieving final foil thickness would become high, and thus the strain accumulated until achieving final foil thickness would become large. Accordingly, it is not preferable since sheet cuts and ruptures are prone to occur during the cold rolling. When the intermediate annealing is performed at lower than 350° C., the crystal grain tends to become coarse during the final annealing. This would impede uniform deformation, and thus may decrease the bulging height. There is no particular limitation regarding the upper limit of the intermediate annealing temperature. The upper limit is, for example, 350, 370, 400, 430, 450, or 500° C. or higher. The intermediate annealing temperature may be in the range of two values selected from the values exemplified above. The higher the intermediate annealing temperature is, the more of Fe precipitated during the hot rolling would form a solid solution again in the aluminum alloy, thereby achieving improvement in strength after the final annealing.

In the manufacturing method of the aluminum alloy foil according to the present embodiment, the cold rolling from after the intermediate annealing until achieving final foil thickness is performed by 95% or more. The cold rolling rate from after the intermediate annealing until achieving final foil thickness has a large effect on the average crystal grain size of the aluminum alloy foil after the final annealing. In the afore-mentioned homogeneous retention, a large number of intermetallic compounds are allowed to exist when the recrystallization proceeds during the casting, the intermetallic compounds having a circle equivalent diameter of 1.0 to 5.0 µm and tending to serve as the nucleus generation site. Here, the cold rolling rate from after the intermediate annealing until achieving final foil thickness serves as a driving force of recrystallization. By adjusting such cold rolling rate to 95% or more, the average crystal grain size after the final annealing can be made fine.

When the afore-mentioned cold rolling rate is less than 95%, the strain accumulated during cold rolling would become small, and thus the crystal grain size after the final annealing would become coarse. Therefore, the strength would decrease and the formability would also decrease. Here, there is no particular limitation regarding the upper limit of the cold rolling rate. The larger the cold rolling rate is, the more preferable. Here, the cold rolling rate is more preferably 97% or more.

After the completion of the cold rolling, final annealing is carried out in order to obtain a soft foil of the aluminum alloy foil. From the viewpoint of allowing recrystallization completely and volatilizing the rolling oil completely, the final annealing is preferably carried out at 250 to 400° C. for 5 hours or more. The final annealing is performed more preferably at 250 to 350° C. for 20 hours or more. The temperature for the final annealing is, for example, 250, 260, 270, 280, 290, 300, 310, 320, 330, 340, 350, 360, 370, 380, 390, or 400° C. or higher. The temperature for the final annealing may be in the range of two values selected from the values exemplified above. The period for performing the final annealing is, for example, 5, 10, 20, 30, 40, 50, 60, 70, 80, 90, 100, 110, 120, 130, 140, or 150 hours or more. The period for performing the final annealing may be in the range of two values selected from the values exemplified above.

When the temperature of the final annealing is lower than 250° C., recrystallization would not proceed completely, and thus it becomes difficult to obtain a desired foil. On the other hand, when the temperature of the final annealing exceeds 400° C., the crystal becomes coarse during annealing, and thus it is unfavorable since the formability decreases. When the retention period during the final annealing is less than 5 hours, the rolling oil would not volatize sufficiently, and thus the wettability of the foil surface decreases. Considering a case where the aluminum alloy foil of the present embodiment being used as the formed packaging material, the adhesion property between the aluminum alloy foil and the resin film for lamination tends to decrease.

There is no particular limitation regarding the rate of temperature increase during the final annealing. It is preferable that the final annealing is performed with the rate of temperature increase of 50° C./hr or less. When the rate of temperature increase during the final annealing exceeds 50° C./hr, a part of the crystal grain would become coarse, thereby easily causing uneven deformation during the square-cup drawing. Therefore, there are cases where the bulgability of the aluminum alloy foil decreases. From the viewpoint of the average crystal grain size of the aluminum alloy foil, the rate of temperature increase during the final annealing is preferably 40° C./hr or less. The rate of temperature increase during the final annealing is, for example, 50, 45, 40, 35, 30, 25, 20, 15, or 10° C./hr or less. The rate of temperature increase may be in the range of two values selected from the values exemplified above.

<Formed Packaging Material>

In the present embodiment, the aluminum alloy foil can be suitably used for the external material as the formed packaging material. In the present specification, the formed packaging material is the aluminum alloy foil of the present embodiment being formed for various packaging purposes such as for the secondary battery, PTP, and the like. Here, the substance to be packaged is, for example, a medicine, lithium ion secondary battery material (including an electrode, a separator, an electrolyte solution and the like).

The formed packaging material of the present embodiment uses the aluminum alloy foil of the present embodiment. Therefore, the formed packaging material can be suitably used as the formed packaging material of a secondary battery and a package container for medicine. Accordingly, performance of the secondary battery can be improved, and the degree of freedom for the use in medicine can be improved.

Hereinafter, the formed packaging material of the present embodiment will be described in detail with reference to the drawings. The embodiments of the formed packaging material described hereinafter are merely examples, and the present invention shall not be limited to these.

Figure 2:
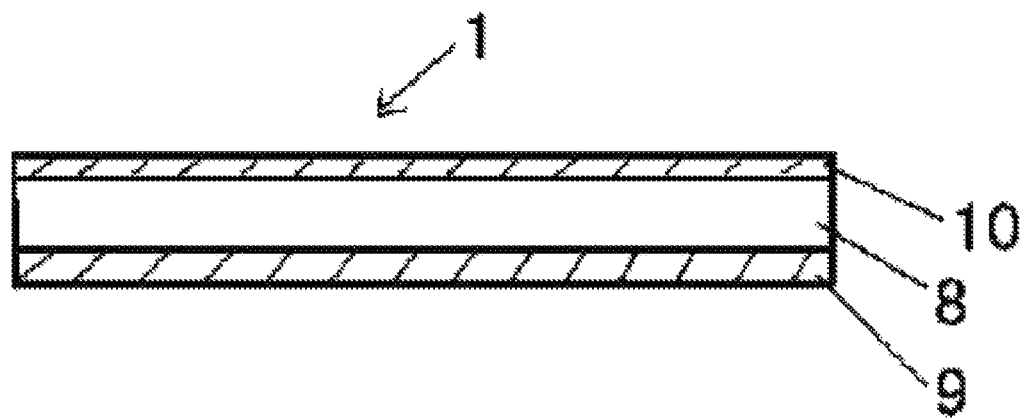
FIG. 2 is a schematic cross-sectional view showing a general example of an external material of a secondary battery.

FIG. 1 is a schematic cross-sectional view showing one example of the internal structure of the lithium ion secondary battery having a thin sheet form. On the other hand, FIG. 2 is a schematic cross-sectional view showing a general example of an external material of a secondary battery.

The formed packaging material 1 of the present embodiment can be structured as a single body of the aluminum alloy foil 8 of the present embodiment, or can be structured as a multilayer structure including the aluminum alloy foil 8 of the present embodiment, and thus there is no particular limitation. When the formed packaging material 1 is structured as a multilayer structure, at least the aluminum alloy foil is required as the constituent. Specifically, as shown in FIG. 2, the one having a synthetic resin film 10, an aluminum alloy foil 8, and a heat sealing layer 9 layered in this order can be mentioned for example. Here, there is no particular limitation regarding the layered structure.

The synthetic resin film 10 is laminated on one side of the aluminum alloy foil 8 in order to improve the formability of the formed packaging material 1, protect the aluminum alloy foil 8 as the major material of the packaging body main body, or to allow printing. As such synthetic resin film 10, polyester film, nylon film, and the like is used. The formed packaging material 1 of the present embodiment can be used for the secondary battery or as the package container for medicine. In particular, when the formed packaging material 1 is used for the secondary battery, the formed packaging material of the present embodiment can be used as the external material of the secondary battery. In such case, it is necessary to deal with the heat generation and heat release by the various battery parts contained in the external material. Accordingly, it is preferable to use the heat resistant polyester film as the synthetic resin film 10.

The heat sealing layer 9 is used to seal the edge portion 7 of the packaging body. As the heat sealing layer 9, conventionally known heat-fusing synthetic resin can be used. There is no particular limitation for the heat sealing layer 9, so long as it has superior adhesion property with the aluminum alloy foil 8 used in the present embodiment, and can protect the content. For example, a non-stretched polypropylene film, a biaxially-stretched polypropylene film, or a polyolefin film modified with maleic acid is preferably used.

When the formed packaging material 1 of the present embodiment is structured as the multilayer structure, there is no particular limitation so long as it uses the aluminum alloy foil 8 of the present embodiment, and shows desirable properties such as formability and adhesion property, and is suitable regarding the property of the content. For example, by using the usual method, a non-stretched polypropylene film is placed onto one side of the aluminum alloy foil 8, having an adhesive film acting as an intermediary. Then, the foil and films are crimped to bond the aluminum alloy foil 8 and the non-stretched polypropylene film. Subsequently, an adhesive is coated onto the other side of the aluminum alloy foil 8, and then a synthetic resin film 10 can be placed thereon and adhered.

The crimping of the aluminum alloy foil 8 and the polypropylene film is generally carried out under heated conditions. There is no particular limitation with respect to the heating conditions. Here, the temperature of heating is approximately 160 to 240° C. In addition, there is no particular limitation with respect to the crimping conditions. Here, the pressure is 0.5 to 2 $kg/cm^2$, and the crimping period is approximately 0.5 to 3 seconds.

In addition, conventionally known adhesive is used for the adhesive of the synthetic resin film 10. For example, an urethane-based adhesive and the like is used.

The formed packaging material of the present embodiment can be formed by a known method. There is no particular limitation regarding the method for forming. In particular, the deep drawing can preferably be used. Here, in one example of obtaining a packaging body by using the formed packaging material 1 of the present embodiment, the formed packaging material 1 is first cut into a desired size to obtain a packaging material of desired shape. Subsequently, the deep drawing is performed so that the center portion becomes the concave portion and the peripheral portion becomes the planar portion, and the heat sealing layer 9 side is positioned inside. The two sheets of the packaging materials after the deep drawing are put together so that the concave portions face each other, and the heat sealing layers 9 at the periphery portions come in contact with each other. Then, heat sealing is carried out while leaving a portion not sealed, thereby obtaining the packaging body. In the case of an external material for a secondary battery, the secondary battery can be manufactured by placing a positive electrode current collector 2, a positive electrode 3, a separator material 4, a negative electrode 5, and a negative electrode current collector 6 in the central portion, followed by impregnation with the electrolyte. In addition, known manufacturing methods can be used for manufacturing the secondary battery, including a method to draw out a lead wire extending from the secondary battery main body, and then further performing heat sealing of the opening portion of the package.

Regarding the secondary battery of the present embodiment, the afore-mentioned formed packaging material 1 comprising the aluminum alloy foil having superior formability is used. Therefore, the deep drawing can be performed with deeper concave portions compared with the conventional ones. Accordingly, an external material for secondary battery having larger volume capacity can be formed, thereby achieving a secondary battery having a charging capacity which can endure long-term usage or a high output property.

When a package container for medicine is intended by using the formed packaging material 1 of the present embodiment, the afore-mentioned method can be applied. For example, regarding PTP as the intended use, a medicine (tablets, capsules and the like) can be contained so as to be used as the package container for medicine. The package container for medicine of the present embodiment can be manufactured by known methods, and there is no particular limitation regarding the manufacturing method.

Regarding such package container for medicine, the afore-mentioned formed packaging material 1 comprising the aluminum alloy foil 8 having superior formability is used. Therefore, the deep drawing can be performed under severe conditions to achieve square-cup drawing. Therefore, material cost of formed packaging material 1 can be reduced. In addition, the average crystal grain diameter and the number of specific intermetallic compounds are appropriately controlled in the aluminum alloy foil of the package container for medicine. Therefore, uneven deformation hardly occurs during the deep drawing, and the occurrence of cracks at the corner portion of the formed body is less. Accordingly, the external vapor hardly comes into the formed packaging material, achieving superior long-term quality managing performance for the contents such as tablets, which require vapor barrier property during storage.

The embodiments of the present invention have been described. Here, constituents other than the ones mentioned above can be used so long as it does not deviate the concept of the present invention.

For example, the formed packaging material 1 was used for the secondary battery or for the package for medicine in the afore-mentioned embodiment. However, there is no particular limitation regarding the intended use, and thus it can be used for other packaging purposes. For example, the formed packaging material 1 can be used for not only the secondary battery but also for the primary battery. Accordingly, deep drawing can be performed to achieve deeper concave portion compared with the conventional ones. As a result, an external material for a primary battery having larger volume capacity can be formed, thereby achieving a primary battery having a charging capacity which can endure long-term usage or a high output property.

EXAMPLES

Hereinafter, the present invention will be described with reference to examples. Here, the present invention shall not be limited to these examples.

Aluminum ingots having the composition provided in Table 1 were prepared, followed by homogeneous retention, hot rolling, cold rolling, intermediate annealing and final annealing as provided in Table 1, thereby obtaining the aluminum alloy foil having a thickness of 40 μm as the final foil. With respect to the aluminum alloy foils thus obtained, tensile strength, 0.2% yield strength, and elongation in the 0 degrees, 45 degrees, and 90 degrees with respect to the rolling direction were measured. The results are shown in Table 2. Occurrence or non-occurrence of cracks during the cold rolling for obtaining the final foil thickness is shown in Table 2. In addition, the average crystal grain size of the aluminum alloy foil and the number of intermetallic compounds at the surface of the aluminum alloy foil are shown in Table 2. Further, a laminated composite material simulating the actual external material of a battery was prepared. Then, the square-cup drawing test was conducted. The results are also shown in Table 2.

The tensile strength of the aluminum alloy foil was obtained as follows. Using a strip test piece with 10 mm width, tensile test was conducted with a gauge length of 50 mm and a crosshead speed of 10 mm/min. The maximum load applied onto the strip test piece was measured, and the stress was calculated as the tensile strength by dividing the maximum load with the cross sectional area of the initial test piece. In addition, the 0.2% yield strength was obtained as follows. In a load-elongation curve, the initial portion in the region having elasticity where the curve is nearly a linear is chosen. Then, with a 0.2% offset from this linear line, a parallel line is drawn. The point where this line and the load-elongation curve cross with each other, that is, the point corresponding to a yield point of a steel material and the like was determined, and the value of the crossing point was taken as the 0.2% yield strength. Further, elongation was obtained as follows. In a similar manner as the measurement of the tensile strength, the gauge length when the strip test piece broke was obtained as L (mm), and the elongation was calculated by the equation of $[(L-50)/50] \times 100$.

The deep drawing property of the drawn packaging material using the aluminum alloy foil of the Examples were measured by the following procedures. Organosol comprising 15 parts by weight of polypropylene modified with maleic acid having an average grain size of 6 to 8 μm and 85 parts by weight of toluene was coated onto one side of each of the aluminum alloy foils obtained in the Example. Subsequently, drying was conducted at 200° C. for 20 seconds to give an adhesive film having 2 μm thickness. Then, a polypropylene film having a thickness of 40 μm was bonded to the adhesive film surface by crimping. Here, the crimping was performed under the temperature of 200° C., pressure of 2 kg/cm$^2$, and crimping period of 1 second. Finally, a biaxially-stretched nylon having a thickness of 25 μm was bonded onto the other side (the side onto which the stretched film is not bonded) of the aluminum alloy foil by having an urethane-based adhesive acting as an intermediary. Accordingly, the drawn packaging material was obtained.

The afore-mentioned drawn packaging material was cut into 120 mm×100 mm, and was used as the sample for the square-cup drawing test. Here, a punching device having a length of 60 mm, width of 40 mm, shoulder radius R of 2.0 mm and corner radius R of 2.0 mm was used in the test. The square-cup drawing test was conducted with a blank holding force of 1000 kgf. The bulging height was made higher from 1.0 mm with a pitch of 0.5 mm. The square-cup drawing test was conducted for 5 times regarding each of the bulging height. The maximum height with no occurrence of pinholes or cracks for all of the 5 tests is shown in Table 2.

The average crystal grain size of the aluminum alloy foil was measured as follows. Each of the aluminum alloy foils obtained were subjected to electropolishing under the voltage of 20V using a mixture solution of 20 parts by volume of perchloric acid and 80 parts by volume of ethanol at 5° C. or lower. Subsequently, the aluminum alloy foils were rinsed with water, dried, and were then subjected to formation of anode oxidation film under the voltage of 20V using a mixture solution of 50 parts by volume of phosphoric acid, 47 parts by volume of methanol, and 3 parts by volume of hydrofluoric acid at 25° C. or lower. Then, polarized light was applied onto the aluminum alloy foil by using an optical microscope. The crystal grains were observed and their pictures were taken. From the pictures taken, the average crystal grain size was measured by the intercept method, corresponding to JIS H0501. The intercept method is a method in which the number of crystal grains found in a line segment is counted, and then the length of the line segment is divided by the number of crystal grains. The average crystal grain sizes for each of the aluminum alloy foil are shown in Table 2.

The number of the intermetallic compounds on the surface of the aluminum alloy foil was measured as follows. The surface of the aluminum alloy foil was subjected to mirror polishing, and then observation was made for 10 visual fields by the magnification of 400. In the observation, the number of the intermetallic compounds was measured using an image analysis device. Then, the circle equivalent diameters for each of the intermetallic compounds were obtained. Here, the circle equivalent diameter is a converted diameter of a perfect circle having the area of the intermetallic compound. The number of the intermetallic compounds and the circle equivalent diameter were measured using an image analysis software and "EIZO-kun" (available from Asahi Kasei Engineering Corporation).

TABLE 1

| | Alloy No. | Chemical Composition (mass %) | | | | | Homogeneous Retention | | Hot Rolling | |
|---|---|---|---|---|---|---|---|---|---|---|
| | | Si | Fe | Cu | Al | Others in Total | Temp. (° C.) | Retention Period (hr) | Starting Temp. (° C.) | Final Sheet Thickness (mm) |
| Example | 1 | 0.14 | 0.81 | 0.41 | rest | 0.06 | 400 | 6 | 390 | 3.0 |
| | 2 | 0.14 | 0.81 | 0.41 | rest | 0.06 | 450 | 3 | 480 | 3.0 |
| | 3 | 0.05 | 1.03 | 0.28 | rest | 0.08 | 460 | 2 | 440 | 3.0 |
| | 4 | 0.05 | 1.03 | 0.28 | rest | 0.08 | 420 | 5 | 410 | 3.0 |
| | 5 | 0.07 | 1.22 | 0.089 | rest | 0.07 | 520 | 1 | 500 | 2.0 |
| | 6 | 0.07 | 1.22 | 0.089 | rest | 0.07 | 490 | 1 | 480 | 2.5 |
| | 7 | 0.07 | 1.22 | 0.089 | rest | 0.07 | 460 | 2 | 440 | 3.0 |
| | 8 | 0.09 | 1.38 | 0.18 | rest | 0.08 | 520 | 1 | 500 | 2.0 |
| | 9 | 0.09 | 1.38 | 0.18 | rest | 0.08 | 490 | 1 | 480 | 2.5 |
| | 10 | 0.09 | 1.38 | 0.18 | rest | 0.08 | 450 | 2 | 440 | 3.0 |
| | 11 | 0.06 | 1.57 | 0.39 | rest | 0.09 | 520 | 1 | 500 | 2.0 |
| | 12 | 0.06 | 1.57 | 0.39 | rest | 0.09 | 490 | 1 | 480 | 2.5 |
| | 13 | 0.06 | 1.57 | 0.39 | rest | 0.09 | 460 | 2 | 440 | 3.0 |
| | 14 | 0.13 | 1.61 | 0.0028 | rest | 0.06 | 490 | 2 | 475 | 3.0 |
| | 15 | 0.13 | 1.61 | 0.0028 | rest | 0.06 | 410 | 2 | 400 | 3.0 |
| | 16 | 0.15 | 1.83 | 0.48 | rest | 0.12 | 540 | 3 | 530 | 2.0 |
| | 17 | 0.15 | 1.83 | 0.48 | rest | 0.12 | 500 | 1 | 485 | 3.0 |
| | 18 | 0.19 | 1.97 | 0.13 | rest | 0.08 | 510 | 1 | 490 | 2.0 |
| | 19 | 0.19 | 1.97 | 0.13 | rest | 0.08 | 550 | 1 | 535 | 3.0 |
| | 20 | 0.01 | 0.91 | 0.011 | rest | 0.06 | 500 | 2 | 470 | 3.0 |
| | 21 | 0.35 | 1.45 | 0.25 | rest | 0.11 | 500 | 2 | 470 | 3.0 |
| | 22 | 0.08 | 0.60 | 0.012 | rest | 0.05 | 500 | 2 | 470 | 3.0 |
| | 23 | 0.18 | 2.65 | 0.17 | rest | 0.10 | 500 | 2 | 470 | 3.0 |
| | 24 | 0.06 | 0.88 | 0.0018 | rest | 0.03 | 500 | 2 | 470 | 3.0 |
| | 25 | 0.12 | 1.33 | 0.75 | rest | 0.06 | 500 | 2 | 470 | 3.0 |
| | 26 | 0.08 | 1.12 | 0.092 | rest | 0.04 | 300 | 1 | 290 | 3.0 |
| | 27 | 0.08 | 1.12 | 0.092 | rest | 0.04 | 580 | 3 | 530 | 3.0 |
| | 28 | 0.08 | 1.12 | 0.092 | rest | 0.04 | 500 | 0.5 | 470 | 3.0 |
| | 29 | 0.08 | 1.12 | 0.092 | rest | 0.04 | 500 | 10 | 470 | 3.0 |
| | 30 | 0.08 | 1.12 | 0.092 | rest | 0.04 | 500 | 2 | 470 | 3.0 |
| | 31 | 0.08 | 1.12 | 0.092 | rest | 0.04 | 500 | 2 | 470 | 3.0 |
| | 32 | 0.08 | 1.12 | 0.092 | rest | 0.04 | 500 | 2 | 470 | 3.0 |
| | 33 | 0.08 | 1.12 | 0.092 | rest | 0.04 | 500 | 2 | 470 | 3.0 |
| | 34 | 0.08 | 1.12 | 0.092 | rest | 0.04 | 500 | 2 | 470 | 3.0 |
| | 35 | 0.08 | 1.12 | 0.092 | rest | 0.04 | 500 | 2 | 470 | 3.0 |
| | 36 | 0.08 | 1.12 | 0.092 | rest | 0.04 | 500 | 2 | 470 | 3.0 |

| | Alloy No. | Intermediate Annealing Conditions | | | Cold Rolling Rate (Sheet Thickness After Intermediate Annealing – Final Foil Thickness)/ Sheet Thickness After Intermediate Annealing (%) | Final Annealing | | |
|---|---|---|---|---|---|---|---|---|
| | | Sheet Thickness at Annealing (mm) | Temp (° C.) | Period (hr) | | Temp (° C.) | Rate of Temp. Increase (° C./hr) | Period (hr) |
| Example | 1 | 2.50 | 450 | 1 | 98.4 | 250 | 40 | 30 |
| | 2 | 2.50 | 420 | 3 | 98.4 | 250 | 40 | 30 |
| | 3 | 1.20 | 360 | 3 | 96.7 | 260 | 50 | 20 |
| | 4 | 3.00 | 440 | 3 | 98.7 | 260 | 50 | 20 |

TABLE 1-continued

| | | | | | | | |
|---|---|---|---|---|---|---|---|
| 5 | 1.40 | 360 | 3 | 97.1 | 260 | 30 | 20 |
| 6 | 2.00 | 400 | 3 | 98.0 | 260 | 30 | 20 |
| 7 | 3.00 | 440 | 3 | 98.7 | 260 | 30 | 20 |
| 8 | 1.40 | 360 | 3 | 97.1 | 280 | 30 | 20 |
| 9 | 2.00 | 400 | 3 | 98.0 | 280 | 30 | 20 |
| 10 | 3.00 | 440 | 3 | 98.7 | 280 | 30 | 20 |
| 11 | 1.40 | 400 | 3 | 97.1 | 300 | 30 | 20 |
| 12 | 2.00 | 420 | 3 | 98.0 | 300 | 30 | 20 |
| 13 | 3.00 | 450 | 3 | 98.7 | 300 | 30 | 20 |
| 14 | 1.00 | 360 | 3 | 96.0 | 340 | 30 | 20 |
| 15 | 1.20 | 400 | 3 | 96.7 | 340 | 30 | 20 |
| 16 | 1.00 | 360 | 3 | 96.0 | 360 | 30 | 15 |
| 17 | 0.85 | 400 | 3 | 95.3 | 360 | 30 | 15 |
| 18 | 1.00 | 350 | 3 | 96.0 | 400 | 20 | 5 |
| 19 | 0.85 | 420 | 3 | 95.3 | 400 | 20 | 5 |
| 20 | 0.90 | 380 | 3 | 95.6 | 280 | 30 | 20 |
| 21 | 0.90 | 380 | 3 | 95.6 | 280 | 30 | 20 |
| 22 | 0.90 | 380 | 3 | 95.6 | 280 | 30 | 20 |
| 23 | 0.90 | 380 | 3 | 95.6 | 280 | 30 | 20 |
| 24 | 0.90 | 380 | 3 | 95.6 | 280 | 30 | 20 |
| 25 | 0.90 | 380 | 3 | 95.6 | 280 | 30 | 20 |
| 26 | 0.90 | 380 | 3 | 95.6 | 280 | 30 | 20 |
| 27 | 0.90 | 360 | 3 | 95.6 | 280 | 30 | 20 |
| 28 | 0.90 | 380 | 3 | 95.6 | 280 | 30 | 20 |
| 29 | 0.90 | 380 | 3 | 95.6 | 280 | 30 | 20 |
| 30 | 0.90 | 200 | 3 | 95.6 | 280 | 30 | 20 |
| 31 | none | — | — | — | 280 | 30 | 20 |
| 32 | 0.40 | 380 | 3 | 90.0 | 280 | 30 | 20 |
| 33 | 0.90 | 380 | 3 | 95.6 | 160 | 30 | 20 |
| 34 | 0.90 | 380 | 3 | 95.6 | 450 | 30 | 20 |
| 35 | 0.90 | 380 | 3 | 95.6 | 280 | 150 | 20 |
| 36 | 0.90 | 380 | 3 | 95.6 | 280 | 30 | 0.5 |

TABLE 2

| | | Tensile Strength TS (N/mm$^2$) | | | | 0.2% Yield Strength YS (N/mm$^2$) | | | |
|---|---|---|---|---|---|---|---|---|---|
| | Alloy No. | 0 degree | 45 degrees | 90 degrees | Average of 3 directions | 0 degree | 45 degrees | 90 degrees | Average of 3 directions |
| Example | 1 | 104.3 | 95.4 | 102.6 | 100.8 | 69.4 | 63.4 | 64.6 | 65.8 |
| | 2 | 106.1 | 96.4 | 104.5 | 102.4 | 70.5 | 64.0 | 66.5 | 67.0 |
| | 3 | 108.6 | 97.8 | 102.1 | 102.8 | 72.0 | 65.3 | 69.0 | 68.8 |
| | 4 | 109.8 | 98.5 | 103.4 | 103.9 | 72.3 | 66.4 | 69.6 | 69.4 |
| | 5 | 112.2 | 101.4 | 105.9 | 108.5 | 75.3 | 70.6 | 72.7 | 72.9 |
| | 6 | 118.9 | 106.7 | 110.4 | 112.0 | 77.7 | 71.9 | 74.4 | 74.7 |
| | 7 | 124.3 | 110.3 | 115.7 | 116.8 | 78.9 | 73.2 | 75.0 | 75.7 |
| | 8 | 122.2 | 109.5 | 114.8 | 115.5 | 77.2 | 71.2 | 74.4 | 74.3 |
| | 9 | 130.8 | 116.2 | 121.8 | 122.9 | 80.7 | 75.6 | 77.3 | 77.9 |
| | 10 | 136.5 | 124.9 | 128.6 | 130.0 | 85.0 | 79.4 | 81.2 | 81.9 |
| | 11 | 131.8 | 119.4 | 122.7 | 124.6 | 81.5 | 76.4 | 78.5 | 78.8 |
| | 12 | 138.5 | 124.6 | 128.4 | 130.5 | 87.6 | 82.7 | 84.2 | 84.8 |
| | 13 | 141.2 | 125.9 | 132.2 | 133.1 | 90.7 | 85.0 | 87.2 | 87.6 |
| | 14 | 111.3 | 101.6 | 105.3 | 106.1 | 72.6 | 65.3 | 70.4 | 69.4 |
| | 15 | 115.3 | 103.3 | 107.5 | 108.7 | 74.5 | 66.4 | 71.1 | 70.7 |
| | 16 | 143.5 | 128.9 | 134.5 | 135.6 | 87.7 | 82.0 | 84.2 | 84.6 |
| | 17 | 140.2 | 124.5 | 129.4 | 131.4 | 85.5 | 80.1 | 82.4 | 82.7 |
| | 18 | 126.2 | 113.5 | 115.5 | 118.4 | 78.7 | 73.1 | 76.0 | 75.9 |
| | 19 | 120.4 | 108.6 | 113.6 | 114.2 | 76.3 | 71.6 | 74.4 | 74.1 |
| | 20 | 86.2 | 78.5 | 81.6 | 82.1 | 52.0 | 47.2 | 50.4 | 49.9 |
| | 21 | 132.2 | 120.5 | 123.4 | 125.4 | 80.0 | 73.4 | 77.1 | 76.8 |
| | 22 | 72.6 | 63.3 | 66.4 | 67.4 | 40.6 | 37.9 | 39.7 | 39.5 |
| | 23 | 153.6 | 139.5 | 143.9 | 145.7 | 111.6 | 103.2 | 105.3 | 106.7 |
| | 24 | 83.5 | 75.3 | 78.6 | 79.1 | 46.6 | 42.6 | 45.4 | 44.9 |
| | 25 | 163.2 | 145.6 | 152.6 | 153.9 | 118.7 | 106.2 | 111.6 | 112.2 |
| | 26 | 112.6 | 104.5 | 180.6 | 108.6 | 71.9 | 66.1 | 69.4 | 69.1 |
| | 27 | 105.6 | 94.1 | 98.5 | 99.4 | 51.6 | 45.5 | 47.2 | 48.1 |
| | 28 | 106.5 | 97.4 | 100.3 | 101.4 | 65.6 | 57.2 | 62.4 | 61.7 |
| | 29 | 98.4 | 90.6 | 92.5 | 93.8 | 54.8 | 47.4 | 49.3 | 50.5 |
| | 30 | 96.5 | 88.5 | 90.2 | 91.7 | 49.7 | 45.1 | 46.5 | 47.1 |
| | 31 | 117.6 | 103.3 | 108.6 | 109.8 | 70.7 | 13.3 | 87.0 | 67.1 |
| | 32 | 88.6 | 80.1 | 83.6 | 84.1 | 45.7 | 43.1 | 44.6 | 44.8 |
| | 33 | 169.8 | 156.3 | 150.2 | 162.1 | 142.5 | 133.5 | 135.3 | 137.1 |
| | 34 | 95.8 | 88.9 | 91.6 | 92.1 | 45.5 | 43.5 | 44.4 | 44.5 |
| | 35 | 93.4 | 86.8 | 88.6 | 89.6 | 43.9 | 42.0 | 42.7 | 42.9 |
| | 36 | 145.6 | 137.4 | 140.3 | 141.1 | 120.7 | 112.7 | 117.1 | 116.8 |

TABLE 2-continued

|  | Alloy No. | Elongation (%) | | | | Cracks During Cold Rolling | Average Crystal Grain Size (μm) | Square-cup Drawing Test (mm) |
|---|---|---|---|---|---|---|---|---|
|  |  | 0 degree | 45 degrees | 90 degrees | Average of 3 directions | A* |  |  |
| Example | 1 | 13.3 | 21.5 | 15.6 | 16.8 | 1.0 none | 17.8 | 4.5 |
|  | 2 | 13.0 | 22.1 | 16.3 | 17.1 | 1.1 none | 16.5 | 4.5 |
|  | 3 | 15.6 | 24.6 | 21.3 | 20.5 | 1.3 none | 14.8 | 4.5 |
|  | 4 | 16.3 | 23.8 | 20.5 | 20.2 | 1.2 none | 13.9 | 4.5 |
|  | 5 | 21.2 | 30.8 | 23.5 | 25.1 | 1.6 none | 10.5 | 5.0 |
|  | 6 | 20.8 | 30.2 | 21.1 | 24.0 | 1.6 none | 9.7 | 5.0 |
|  | 7 | 20.1 | 29.4 | 22.6 | 24.0 | 1.7 none | 9.2 | 5.5 |
|  | 8 | 15.8 | 24.8 | 18.4 | 19.7 | 1.7 none | 9.8 | 5.5 |
|  | 9 | 15.2 | 24.1 | 17.6 | 19.0 | 1.8 none | 8.5 | 5.5 |
|  | 10 | 14.7 | 22.9 | 16.2 | 17.9 | 1.8 none | 7.9 | 6.0 |
|  | 11 | 13.1 | 22.0 | 15.8 | 17.2 | 2.0 none | 8.6 | 6.0 |
|  | 12 | 13.8 | 23.2 | 18.1 | 18.4 | 2.1 none | 7.7 | 6.5 |
|  | 13 | 13.5 | 22.6 | 16.6 | 17.6 | 2.2 none | 7.1 | 6.5 |
|  | 14 | 23.6 | 32.7 | 25.4 | 27.2 | 1.9 none | 10.2 | 4.5 |
|  | 15 | 23.9 | 33.6 | 26.5 | 28.0 | 2.0 none | 9.1 | 4.5 |
|  | 16 | 10.2 | 19.7 | 16.3 | 15.4 | 2.4 none | 10.9 | 5.0 |
|  | 17 | 11.3 | 19.0 | 16.7 | 15.7 | 2.3 none | 11.6 | 5.0 |
|  | 18 | 17.6 | 16.3 | 20.2 | 21.4 | 2.2 none | 11.2 | 4.5 |
|  | 19 | 16.5 | 25.1 | 18.8 | 20.1 | 2.1 none | 10.8 | 4.5 |
|  | 20 | 18.6 | 27.6 | 19.5 | 21.9 | 1.1 none | 18.6 | 3.0 |
|  | 21 | 12.1 | 14.5 | 15.3 | 14.0 | 0.4 none | 53.3 | 1.5 |
|  | 22 | 13.6 | 18.2 | 14.2 | 15.3 | 0.5 none | 27.6 | 2.0 |
|  | 23 | 24.5 | 36.6 | 27.8 | 29.6 | 2.9 occurred | 8.4 | 3.5 |
|  | 24 | 16.7 | 23.2 | 19.5 | 19.8 | 1.1 none | 19.5 | 2.0 |
|  | 25 | 7.6 | 12.4 | 8.8 | 9.6 | 1.4 occurred | 16.6 | 3.5 |
|  | 26 | 12.8 | 16.3 | 14.4 | 14.5 | 1.3 occurred | 13.5 | 4.0 |
|  | 27 | 18.6 | 26.4 | 19.9 | 21.5 | 0.9 none | 21.4 | 2.5 |
|  | 28 | 13.8 | 15.4 | 14.3 | 14.5 | 1.2 occurred | 15.2 | 4.0 |
|  | 29 | 15.8 | 17.8 | 16.6 | 16.7 | 0.9 none | 26.7 | 2.5 |
|  | 30 | 14.4 | 15.2 | 13.6 | 14.4 | 1.1 none | 39.8 | 2.0 |
|  | 31 | 9.5 | 13.3 | 11.7 | 11.5 | 1.2 occurred | 10.3 | 4.0 |
|  | 32 | 13.6 | 18.8 | 15.8 | 16.1 | 1.1 none | 22.8 | 2.5 |
|  | 33 | 4.5 | 5.2 | 4.8 | 4.8 | 1.2 none | B* | 1.0 |
|  | 34 | 11.8 | 13.2 | 12.4 | 12.5 | 1.2 none | 31.5 | 2.5 |
|  | 35 | 12.3 | 13.7 | 11.2 | 12.4 | 1.2 none | 36.4 | 2.0 |
|  | 36 | 3.0 | 3.5 | 3.3 | 3.3 | 1.2 none | B* | 1.0 |

A*: number of the intermetallic compounds having a circle equivalent diameter of 1.0 to 5.0 μm($\times 10^4$ grains/mm$^2$)
B*: recrystallization did not proceed As apparent from the afore-mentioned results, the aluminum alloy foils of Examples 1 to 19, 26, 28, and 31 are appropriately controlled in terms of composition, average crystal grain size, and number of intermetallic compounds having a circle equivalent diameter of 1.0 to 5.0 μm. Accordingly, the bulging heights when the square-cup drawing test was conducted with the aluminum alloy foils of Examples 1 to 19, 26, 28, and 31 were higher than those when the square-cup drawing test was conducted with the aluminum alloy foils of Examples 20 to 25, 27, 29, 30, and 32 to 36. This shows that the aluminum alloy foils of Examples 1 to 19, 26, 28, and 31 are superior in drawability. Therefore, satisfactory deep drawing can be performed with the drawn packaging material obtained by using the aluminum alloy foils of Examples 1 to 19, 26, 28, and 31. It can be understood that such drawn packaging material is suitable for packaging comparatively thick contents. On the other hand, the bulging heights when the square-cup drawing test was conducted with the aluminum alloy foils of Examples 20 to 25, 27, 29, 30, and 32 to 36 were low, and thus it is obvious that their formability was not superior. Therefore, satisfactory deep drawing cannot be performed with the bulged packaging material obtained by using the aluminum alloy foils of Examples 20 to 25, 27, 29, 30, and 32 to 36. It can be understood that such drawn packaging material is not suitable for packaging comparatively thick contents.

In addition, as apparent from the afore-mentioned results, the aluminum alloy foils of Examples 1 to 19 can achieve higher bulging heights in the square-cup drawing test, when compared with the aluminum alloy foils of Examples 20 to 36. This is since the aluminum alloy ingot having a specific composition is treated under a specific process. This also shows that the aluminum alloy foils of Examples 1 to 19 have superior formability. Therefore, satisfactory deep drawing can be performed with the bulged packaging material obtained by using the aluminum alloy foils of Examples 1 to 19. It can be understood that such bulged packaging material is suitable for packaging comparatively thick contents.

In Example 20, the addition amount of Si was small, and thus the strength was low and the bulging height was not improved.

In Example 21, the addition amount of Si was large, and thus the number of intermetallic compounds having a circle equivalent diameter of 1.0 to 5.0 μm was small. Accordingly, the average crystal grain size became large, and the bulging height was not improved.

In Example 22, the addition amount of Fe was small, and thus the strength was low and the bulging height was not improved.

In Example 23, the addition amount of Fe was large, and thus coarse intermetallic compounds precipitated during casting, and cracks occurred during cold rolling. In addition, the bulging height was not improved.

In Example 24, the addition amount of Cu was small, and thus the strength was low and the bulging height was not improved.

In Example 25, the addition amount of Cu was large, and thus cracks occurred during cold rolling. In addition, the bulging height was not improved.

In Example 26, the temperature of the homogeneous retention was low, and thus the segregation formed in the ingot could not be made uniform sufficiently. Therefore, cracks occurred during cold rolling.

In Example 27, the temperature of homogeneous retention was high, and thus the number of the intermetallic compounds having a circle equivalent diameter of 1.0 to 5.0 µm was small. In addition, the average crystal grain size after the final annealing became large and the strength decreased. Therefore, the bulging height was not improved.

In Example 28, the retention period of the homogeneous retention was short, and thus the segregation formed in the ingot could not be made uniform sufficiently. Therefore, cracks occurred during cold rolling.

In Example 29, the retention period of the homogeneous retention was long, and thus the number of the intermetallic compounds having a circle equivalent diameter of 1.0 to 5.0 µm was small. Accordingly, the average crystal grain size became large, and the bulging height was not improved.

In Example 30, the temperature of the intermediate annealing was low, and thus the average crystal grain size became large and the strength decreased. Therefore, the bulging height was not improved.

In Example 31, the intermediate annealing was not performed, and thus cracks occurred during cold rolling.

In Example 32, the cold rolling rate from after the intermediate annealing until achieving final foil thickness was small, and thus the strength decreased. In addition, the crystal grain became coarse, and the bulging height was not improved.

In Example 33, the final annealing temperature was low, and thus recrystallization did not proceed in the aluminum alloy foil, resulting in decrease in the bulging height.

In Example 34, the final annealing temperature was high, and thus the average crystal grain size became large, and the strength decreased. Accordingly, the bulging height was not improved.

In Example 35, the rate of temperature increase during the final annealing was large and the average crystal grain size was large, and thus the strength decreased and the bulging height was not improved.

In Example 36, the retention period during the final annealing was short, and thus recrystallization did not proceed in the aluminum alloy foil. Accordingly, the bulging height was not improved.

EXPLANATION OF SYMBOLS 1 external material (formed packaging material)
2 positive electrode current collector
3 positive electrode
4 separator material (separator)
5 negative electrode
6 negative electrode current collector
7 edge portion of external material
8 external material main body (aluminum alloy foil)
9 heat sealing layer
10 synthetic resin film

The invention claimed is:

1. An aluminum alloy foil, comprising:
   0.8 to 2.0 mass % of Fe, 0.05 to 0.2 mass % of Si, and 0.0025 to 0.5 mass % of Cu, with the rest consisting of Al and unavoidable impurities, wherein
   the aluminum alloy foil has an average crystal grain size of 20 µm or less, and
   a number of intermetallic compounds existing in the aluminum alloy foil, the intermetallic compounds having a circle equivalent diameter of 1.0 to 5.0 µm, is $1.0 \times 10^4$ grains/mm$^2$ or more.

2. The aluminum alloy foil of claim 1, wherein an average value of tensile strength of the aluminum alloy foil in 0 degrees, 45 degrees, and 90 degrees with respect to the rolling direction is 100 N/mm$^2$ or higher.

3. A formed packaging material comprising the aluminum alloy foil of claim 1.

4. The formed packaging material of claim 3, further comprising:
   a synthetic resin film laminated on one side of the aluminum alloy foil, and
   a heat sealing layer laminated on an other side of the aluminum alloy foil.

5. A secondary battery comprising the formed packaging material of claim 4.

6. A package container for medicine comprising the formed packaging material of claim 4.

7. A method for manufacturing the aluminum alloy foil of claim 1, comprising the steps of:
   performing a homogeneous retention of an aluminum alloy ingot comprising 0.8 to 2.0 mass % of Fe, 0.05 to 0.2 mass % of Si, and 0.0025 to 0.5 mass % of Cu, with the rest consisting of Al and unavoidable impurities at 430° C. or higher and 540° C. or lower for 1 hour or longer and 6 hours or shorter;
   performing a hot rolling immediately after the homogeneous retention, and a cold rolling after the hot rolling;
   performing an intermediate annealing by retaining at 350° C. or higher in between the cold rolling;
   performing the cold rolling at a cold rolling rate of 95% or higher from after the intermediate annealing until achieving final foil thickness; and
   performing final annealing after the cold rolling to obtain the aluminum alloy foil.

* * * * *